US009563719B2

(12) United States Patent
Che et al.

(10) Patent No.: US 9,563,719 B2
(45) Date of Patent: Feb. 7, 2017

(54) SELF-MONITORING OBJECT-ORIENTED APPLICATIONS

(71) Applicant: International Business Machines Corporation, Armonk, NY (US)

(72) Inventors: Yang Che, Beijing (CN); Zhi Da Luo, Beijing (CN); Li Jing Mu, Beijing (CN); Zhi Hua Pan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 14/053,084

(22) Filed: Oct. 14, 2013

(65) Prior Publication Data

US 2014/0040284 A1    Feb. 6, 2014

Related U.S. Application Data

(63) Continuation of application No. 13/406,747, filed on Feb. 28, 2012, now Pat. No. 8,589,894.

(30) Foreign Application Priority Data

Feb. 28, 2011 (CN) .......................... 2011 1 0047972

(51) Int. Cl.
*G06F 17/30* (2006.01)
*G06F 11/30* (2006.01)
(52) U.S. Cl.
CPC ....... *G06F 17/30958* (2013.01); *G06F 11/302* (2013.01); *G06F 11/3013* (2013.01); *G06F 11/3096* (2013.01)

(58) Field of Classification Search
None
See application file for complete search history.

(56) References Cited

U.S. PATENT DOCUMENTS

| 5,790,858 A | 8/1998 | Vogel |
| 5,796,752 A | 8/1998 | Sun et al. |
| 6,126,330 A | 10/2000 | Knight |
| 6,381,739 B1 | 4/2002 | Breternitz, Jr. et al. |
| 7,016,807 B2 | 3/2006 | Morimoto et al. |
| 7,228,530 B2 | 6/2007 | Imai |
| 7,587,709 B2 | 9/2009 | Chilimbi et al. |

(Continued)

FOREIGN PATENT DOCUMENTS

| CN | 1967539 A | 5/2007 |
| WO | 2009154498 A1 | 12/2009 |

OTHER PUBLICATIONS

Borgatti, Stephen P. "Centrality and Network Flow." Social networks. vol. 27, Issue 1. Jan. 2005. pp. 55-71.*

(Continued)

*Primary Examiner* — Alex Gofman
*Assistant Examiner* — Umar Mian
(74) *Attorney, Agent, or Firm* — Cuenot, Forsythe & Kim, LLC

(57) ABSTRACT

A computer-implemented method for monitoring an object-oriented application is disclosed. A transaction-representative-digraph is built based upon a real-time running of the application, and the digraph contains nodes of a plurality of replaceable classes. A key node is selected based upon invocation relationships between the nodes. A monitor program is instrumented at the selected key node.

12 Claims, 14 Drawing Sheets

(56) References Cited

U.S. PATENT DOCUMENTS

| | | | |
|---|---|---|---|
| 2004/0205723 | A1 | 10/2004 | Juan et al. |
| 2005/0182750 | A1 | 8/2005 | Krishna et al. |
| 2006/0117299 | A1 | 6/2006 | Goldsmith et al. |
| 2007/0112737 | A1 | 5/2007 | Carlson et al. |
| 2008/0148039 | A1 | 6/2008 | Cobb et al. |
| 2008/0276227 | A1 | 11/2008 | Greifeneder |
| 2008/0288212 | A1 | 11/2008 | Greifeneder |
| 2009/0119279 | A1* | 5/2009 | Goyal .................. H04L 63/1408 |
| 2009/0249309 | A1 | 10/2009 | Li et al. |
| 2009/0319565 | A1 | 12/2009 | Greenwald et al. |
| 2010/0063973 | A1* | 3/2010 | Cao ................... G06F 17/30477 707/758 |
| 2011/0016460 | A1 | 1/2011 | Archambault et al. |

OTHER PUBLICATIONS

Dmitriev, M., "Profiling Java Applications Using Code Hotswapping and Dynamic Call Graph Revelation," [online] In Proc. of 4th Int'l. Workshop on Software and Performance WOSP '04, vol. 29, No. 1, Jan. 2004, retrieved from the Internet: <labs.oracle.com/projects/jfluid/jfluidpaper-wosp.pdf>, 12 pgs.

Kaagstrom, S., et al., "Automatic Low Overhead Program Instrumentation with the LOPI Framework," In 9th Workshop on Interaction Between Compilers and Computer Architecture, INTERACT-9, Feb. 13, 2005, pp. 82-93, retrieved from the Internet: <www.bth.se/people/ska/lopi.pdf>.

Gao, X., et al., "ALITER: An Asynchronous Lightweight Instrumentation Tool for Event Recording," In Workshop on Binary Instrumentation and Applications (WBIA) 2005, retrieved from the Internet: <www.sdsc.edu/~allans/bintool.pdf>, 6 pgs.

Nesheiwat, J., et al., "Performance Analysis Support for Object Oriented Parallel Scientific Applications," Rensselaer Polytechnic Institute, In Scalable Instrumentation and Program Database, Dec. 2, 1998, retrieved from the Internet: <www.cs.rpi.edu/research/pdf/98-5.pdf> 22 pgs.

CN Appln. No. 201110047972.2, Office Action, 6 pg.

* cited by examiner

SELF-MONITORING OBJECT-ORIENTED APPLICATIONS

CROSS-REFERENCE TO RELATED APPLICATIONS

This application is a Continuation of U.S. application Ser. No. 13/406,747, filed on Feb. 28, 2012, which claims the benefit of China Application Number 201110047972.2, filed on Feb. 28, 2011, and is incorporated herein by reference in its entirety.

BACKGROUND

Field of the Invention

The present disclosure relates to a computer monitoring system, and more specifically, to a system for self-monitoring object-oriented applications.

Description of the Related Art

Monitoring the running states of computer software is an important task. In the context of modern cloud computing, the real-time monitoring of software running states of each node, in the context of cloud computing, is valuable to provide knowledge of health conditions of the whole cloud computing system and maintenance of the whole cloud computing system.

FIG. 1 is a transaction-representative-digraph of an object-oriented application. A transaction is a series of operations executed by a single logic working unit, and a combination of the operations is a unit either totally successful or totally failed. For example, drawing money is a transaction. Either drawing money is successful or drawing money fails. A class is an abstract of objects having identical or similar properties. For example, drawing money from ATM machine, drawing money by password authentication, drawing money by fingerprint authentication, drawing money by pupil authentication and drawing money by authentication card are five classes. The transaction of drawing money is uniformly represented by an interface. The interface declares such a transaction as drawing money but does not to implement it, and waits for each class to implement it respectively. In the implementations, the five classes of drawing money from ATM machine, drawing money by password authentication, drawing money by fingerprint authentication, drawing money by pupil authentication and drawing money by authentication card respectively implement the interface of drawing money, but have different modes of implementation. Each process invoked by the specific implementations is a node (i.e., method) in FIG. 1.

For example, when drawing money from an ATM machine, a node 10 starts working, that is, drawing money from ATM machine is accepted. During the process, password authentication is needed, so the node 10 invokes the node 2. When the node 2 performs the password authentication, it is needed to compare with a password library or identity database, so a node 11 or 8 can be invoked. When the node 11 performs comparison with the password library, it is needed to invoke the password library, so the node 12 is invoked. When the node 8 performs comparison with the identity database, it is needed to invoke the identity database, so a node 9 is invoked. FIG. 1 represents a complete transaction of drawing money.

Previously, when it is needed to monitor an object-oriented application, real-time running of the application is monitored first, and then a transaction-representative-digraph shown in FIG. 1 is built according to the real-time running of the application. Thereafter, a monitor program is instrumented before and after each node in the figure, as shown in FIG. 2, in which instrument 15 monitor the programs in FIG. 2. However, monitor overheads are high because a monitor program is needed to be instrumented before and after each node.

BRIEF SUMMARY

A computer-implemented method for monitoring an object-oriented application is disclosed. A transaction-representative-digraph is built based upon a real-time running of the application, and the digraph contains nodes of a plurality of replaceable classes. A key node is selected based upon invocation relationships between the nodes. A monitor program is instrumented at the selected key node.

A computer hardware system for monitoring an object-oriented application is disclosed. The system comprises at least one processor, and the at least one processor is configured to perform and/or generate instructions for performing the following. A transaction-representative-digraph is built based upon a real-time running of the application, and the digraph contains nodes of a plurality of replaceable classes. A key node is selected based upon invocation relationships between the nodes. A monitor program is instrumented at the selected key node.

A computer program product comprises a computer usable storage medium having stored therein computer usable program code for monitoring an object-oriented application. The computer usable program code, which when executed by a computer hardware system causes the computer hardware system to perform the following. A transaction-representative-digraph is built based upon a real-time running of the application, and the digraph contains nodes of a plurality of replaceable classes. A key node is selected based upon invocation relationships between the nodes. A monitor program is instrumented at the selected key node.

BRIEF DESCRIPTION OF THE SEVERAL VIEWS OF THE DRAWINGS

The invention may be better understood by combining the description referring to drawings below, in which the same or similar reference numbers represent the same or similar components throughout the drawings. The drawings are included within the description and constitute a part of the description along with the detailed description below, and are used to explain the preferred embodiments of the invention illustratively and illustrate the principal and advantage of the embodiments of the invention. In the drawings.

DETAILED DESCRIPTION

Figure 1:
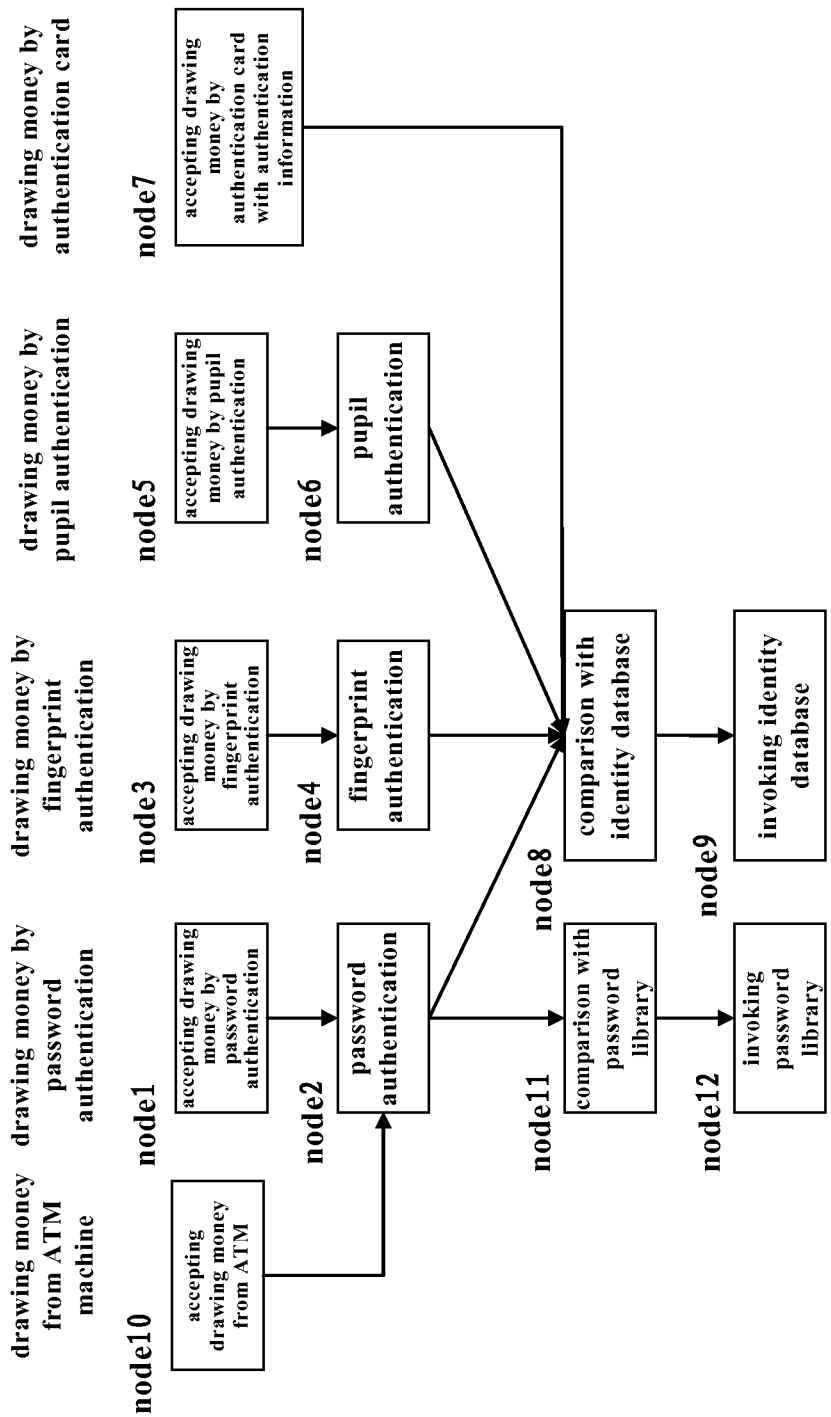
FIG. 1 is a transaction-representative-digraph of an object-oriented application according to the prior art.
Figure 2:
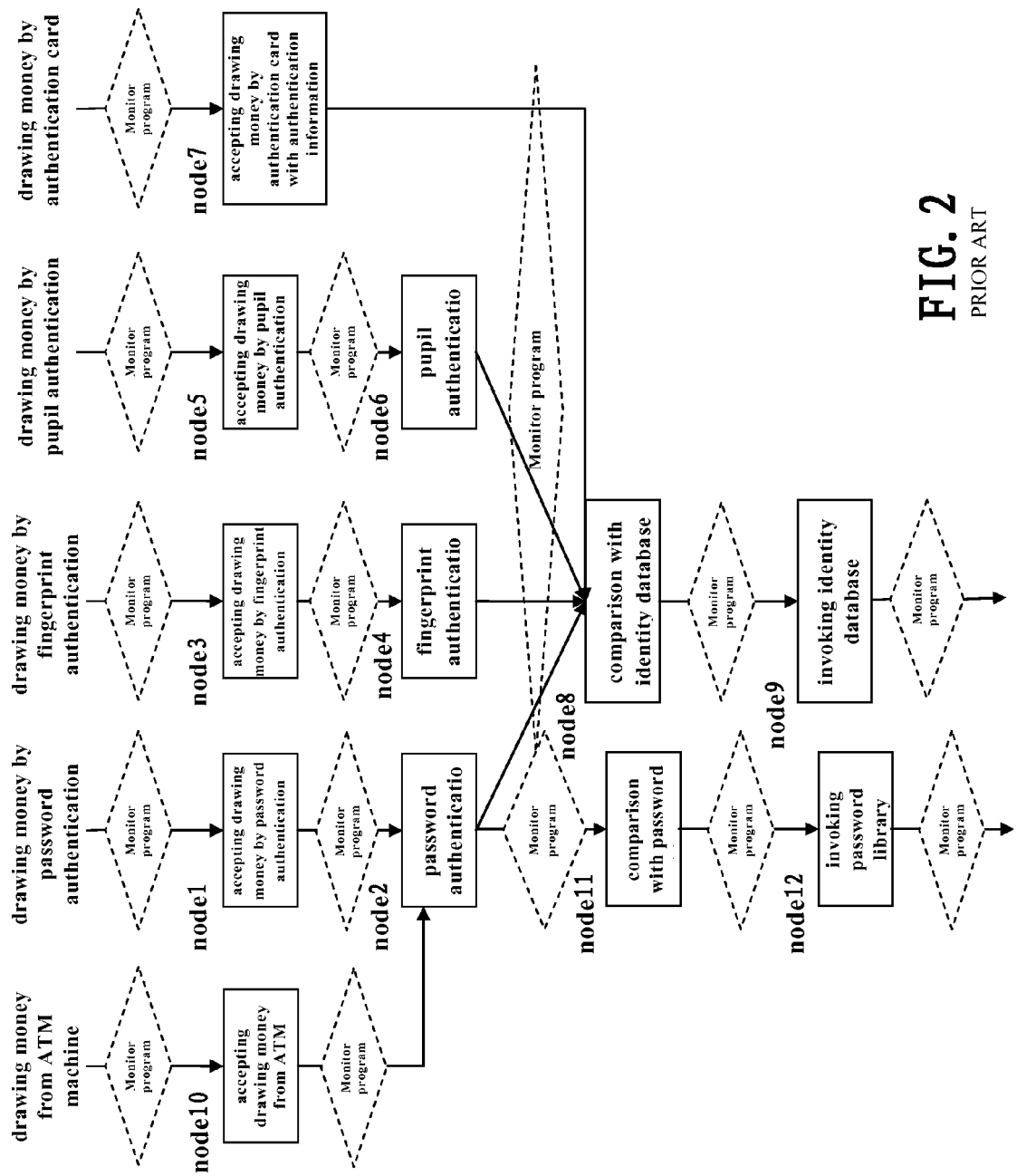
FIG. 2 is a transaction-representative-digraph instrumented with monitor programs according to the prior art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain (or store) a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. Each block of the flowchart illustrations and/or block diagrams, and combinations of blocks in the flowchart illustrations and/or block diagrams, can be implemented using computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Adapters and proxies are widely used in the object-oriented program design, and thus the monitoring of these nodes (i.e., the adapters and proxies) is not particularly needed. Thus, monitor programs do not need to be instrumented before and after the adapters and proxies. The adapters and proxies generally do not have a very high in-degree wherein "in-degree" is defined as a number of times that a node is invoked by other nodes. In addition, replaceability often exists between nodes of different replaceable classes. Therefore, by selecting several key nodes from all the nodes, according to invocation relationships between the nodes of replaceable classes, and instrumenting monitor programs into the key nodes, the overhead associated with monitoring the object-oriented application can be greatly reduced.

Figure 3:
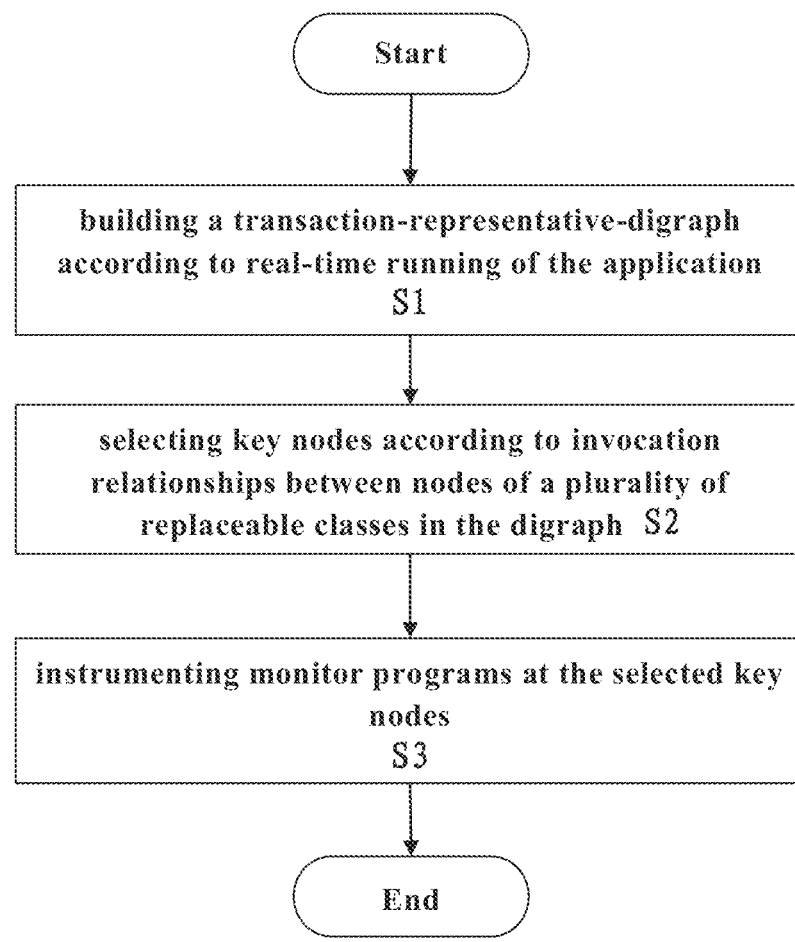
FIG. 3 is a flow chart.

FIG. 3 is a flow chart for monitoring an object-oriented application. At S1, a transaction-representative-digraph is built according to real-time running of the application, and the digraph contains nodes of a plurality of replaceable classes. At S1, key nodes are selected according to invocation relationships between the nodes of a plurality of replaceable classes in the digraph. At S3, monitor programs are instrumented at the selected key nodes.

Figure 4:
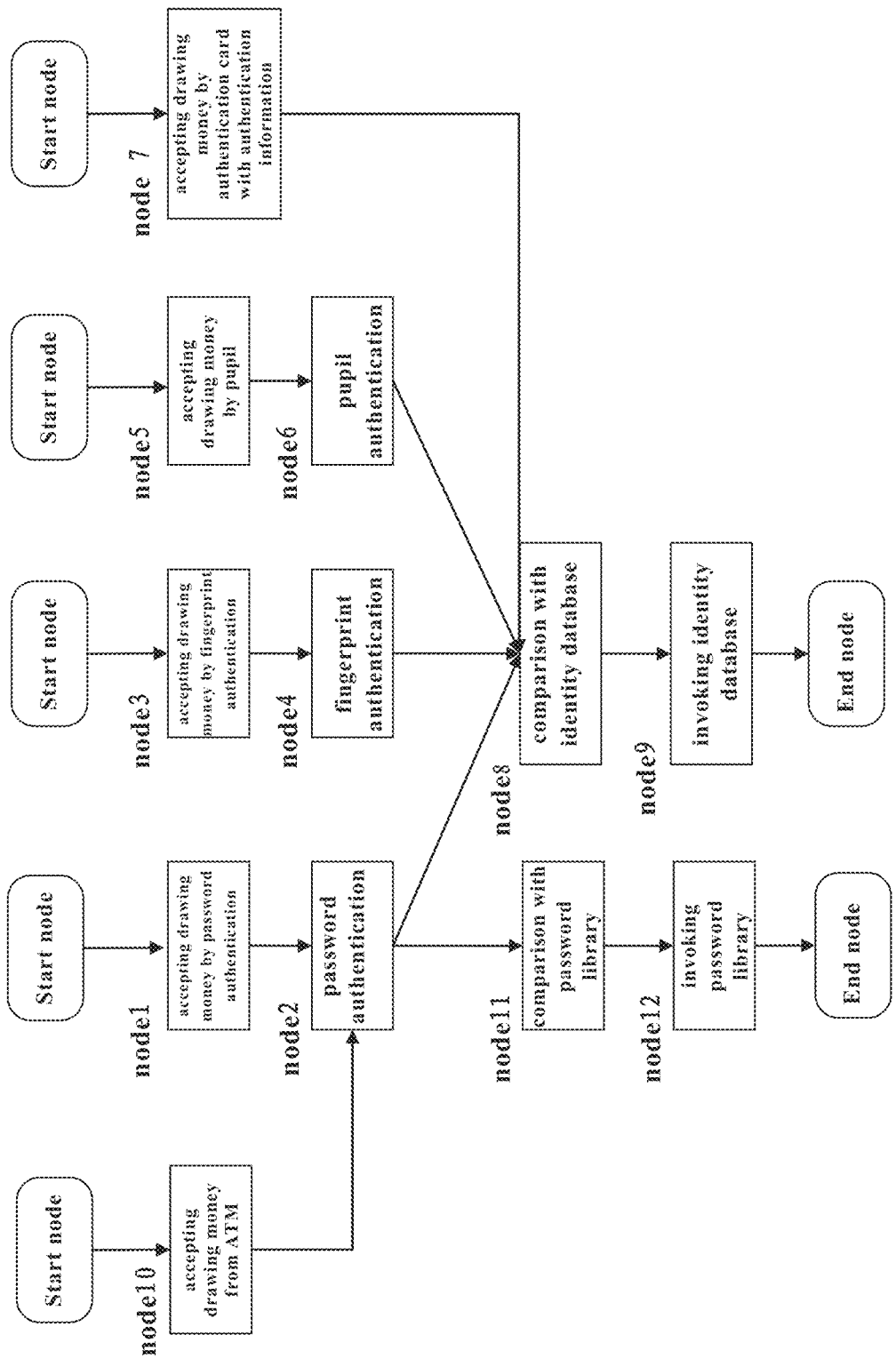
FIG. 4 is a transaction-representative-digraph to which start nodes and end nodes are added.

In certain aspects, a start node invoking the top node is added before a top node, and an end node invoked by the bottom node is added after a bottom node. The top node is a node that is not invoked by other nodes but only invokes other nodes, and the bottom node is a node that is only invoked by other nodes but does not invoke other nodes. FIG. 4 is a transaction-representative-digraph to which start nodes and end nodes are added. By way of example, in FIG. 4, nodes 10, 1, 3, 5, 7 are top nodes, and nodes 12 and 9 are bottom nodes. Different techniques of selecting key nodes and instrumenting monitoring programs are described in the following examples:

Example 1

In this example, all the nodes are ranked according to the in-degree, and the first n nodes therefrom are selected as key nodes. N is a natural number and the in-degree is a number of times that a node in the figure is invoked by other nodes. For example, n=3, bearing in mind that n may be any natural number. The in-degree of each node in FIG. 4 is calculated as follows:

Node 1: 1
Node 2: 2
Node 3: 1
Node 4: 1
Node 5: 1
Node 6: 1
Node 7: 1
Node 8: 4
Node 9: 1
Node 10: 1
Node 11: 1
Node 12: 1
All start nodes: 0
All end nodes: 1

If a plurality of nodes have the same in-degree, in general, nodes nearest to the start nodes are selected. If there are a plurality nodes that have the same in-degree and are nearest to the start nodes, they can be selected arbitrarily.

In this example, a node with the highest in-degree is node 8, and a node with the second highest in-degree is node 2. Since there are a plurality of nodes 10, 1, 3, 5, 7 that have the third highest in-degree and are nearest to the start nodes, the node 1 can be arbitrarily selected among them.

Figure 5:
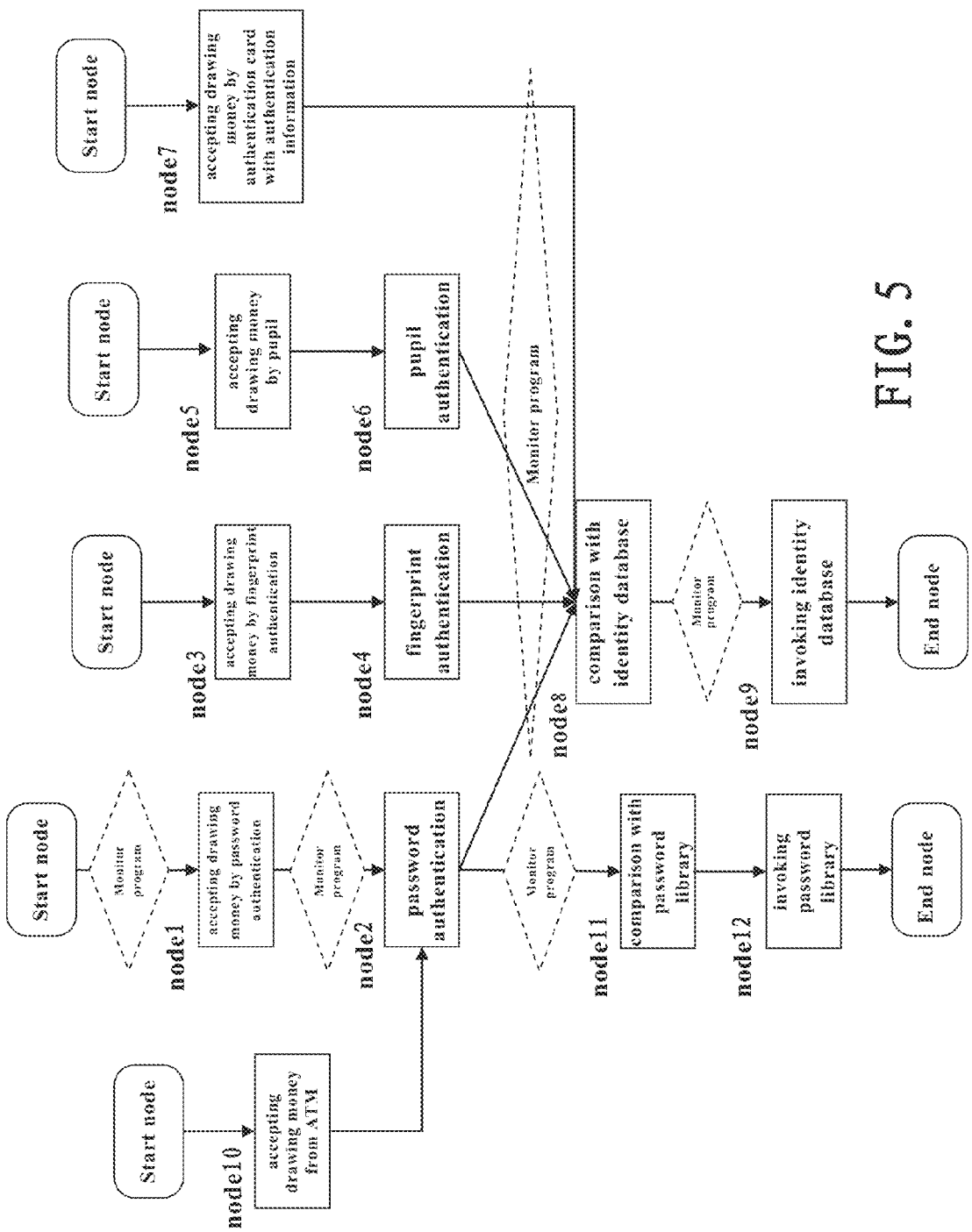
FIG. 5 is a transaction-representative-digraph instrumented with monitor programs.

Monitor programs are instrumented before and after the selected three key nodes 8, 2 and 1. Since a monitor program already exists when instrumenting a monitor program after the node 1, repeated instrumentation is not performed. The instrumentation results are illustrated within FIG. 5. Alternatively, monitor programs may be instrumented only before the selected three key nodes 8, 2, 1 . In yet another alternative, monitor programs may be instrumented only after the selected three key nodes 8, 2, 1. Since nodes with a larger in-degree are nodes with poor replaceability, only instrumenting monitor programs before and/or after these nodes can greatly reduce the overhead of monitoring the object-oriented application.

Example 2

Figure 6:
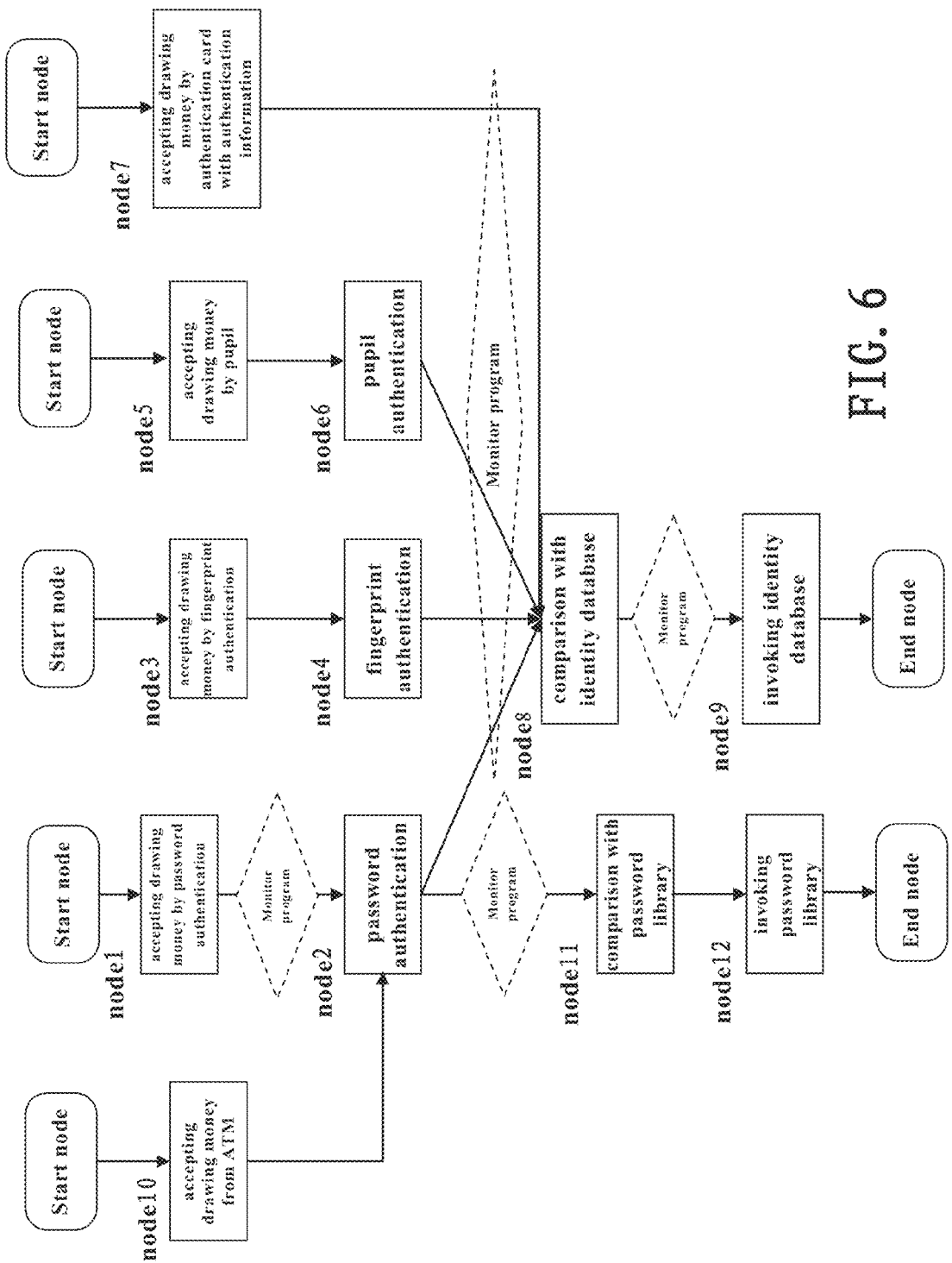
FIG. 6 is a transaction-representative-digraph instrumented with monitor programs.

In this example, all the nodes having an in-degree reaching a threshold in the figure are selected as key nodes. For example, the set threshold=2 bearing in mind that threshold may be other values. Using this example, nodes having an in-degree that reaches 2 only includes nodes 8 and 2. Therefore, monitor programs are instrumented only before and after the nodes 8 and 2, as illustrated within FIG. 6. As already noted above, the monitor programs may be instrumented only before or after the selected nodes 8 and 2. Since nodes with a larger in-degree are nodes with poor replaceability, only instrumenting monitor programs before and/or after these nodes can greatly reduce the overhead of monitoring the object-oriented application.

Example 3

In this example, all the nodes in the figure are ranked according to a difference between the in-degree and the out-degree, and the first n nodes therefrom are selected as key nodes. N is a natural number, and the out-degree is a number of times that a node in the figure invokes other nodes. For example, n=3 bearing in mind that n may be any natural number. A difference between the in-degree and the out-degree of each node in FIG. 4 is calculated as follows:

Node 1: 0
Node 2: 0
Node 3: 0
Node 4: 0
Node 5: 0
Node 6: 0
Node 7: 0
Node 8: 3
Node 9: 0
Node 10: 0
Node 11: 0
Node 12: 0
All start nodes: −1
All end nodes: 1

Figure 7:
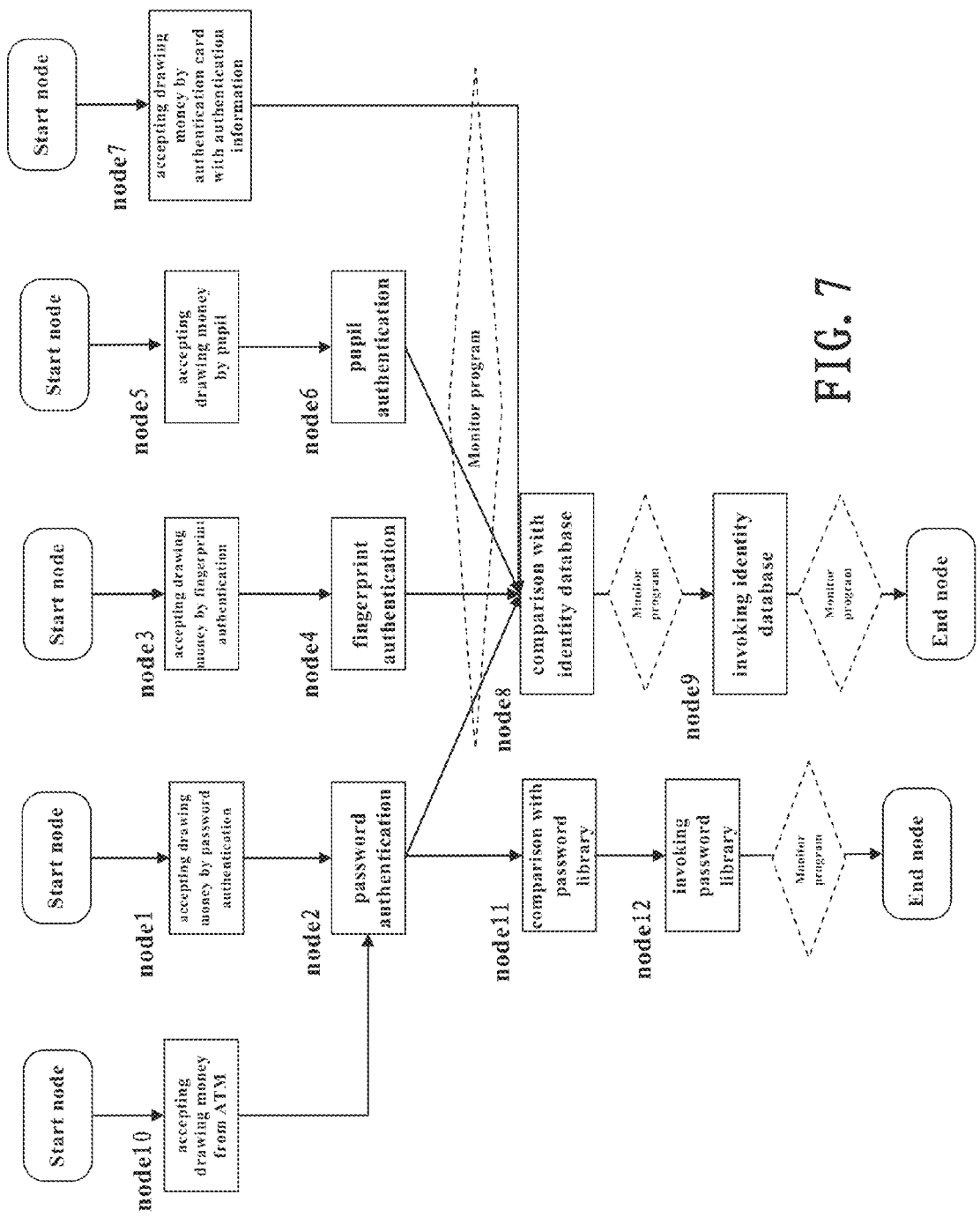
FIG. 7 is a transaction-representative-digraph instrumented with monitor programs.

Monitor programs are instrumented before and after the selected node 8 and two end nodes. Since monitor programs cannot be instrumented after the end nodes, monitor programs are instrumented only before the end nodes. The instrumentation results are illustrated within FIG. 7. As already noted above, the monitor programs may be instrumented only before or after the selected nodes. Since nodes with a larger in-degree are nodes with poor replaceability, only instrumenting monitor programs before and/or after these nodes can greatly reduce the overhead of monitoring the object-oriented application.

Example 4

Figure 8:
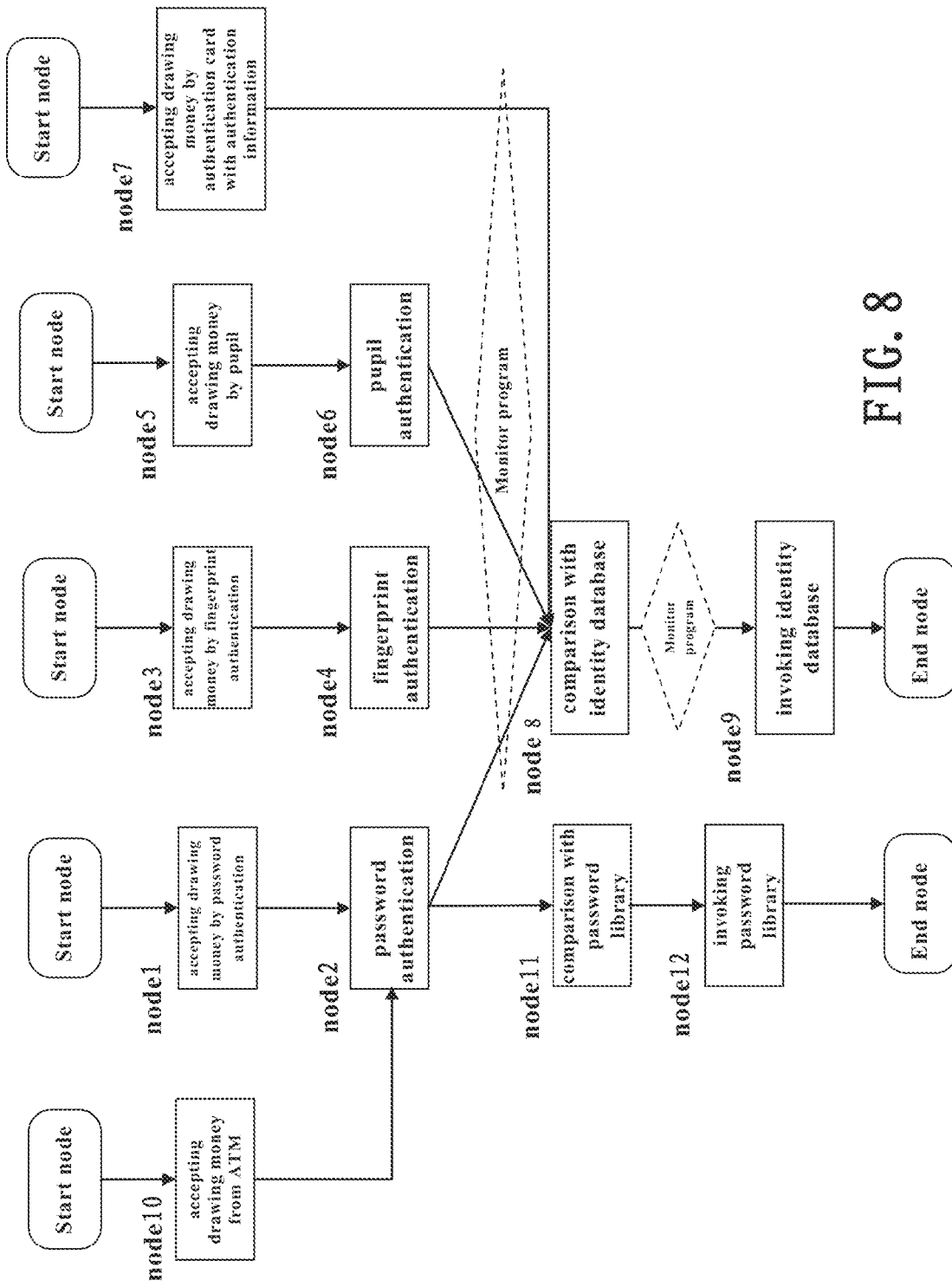
FIG. 8 is a transaction-representative-digraph instrumented with monitor programs.

In this example, all the nodes whose difference between the in-degree and the out-degree reaches a threshold in the figure are selected as key nodes. For example, the set threshold=2 bearing in mind that threshold may be other values. In this example, nodes whose difference between the in-degree and the out-degree reaches 2 only comprise node 8. Therefore, monitor programs are instrumented only before and after the node 8, as illustrated within FIG. 8. As already noted above, the monitor programs may be instrumented only before or after the selected node 8. Since nodes with a larger difference between the in-degree and the out-degree are nodes with poor replaceability, only instrumenting monitor programs before and/or after them can greatly reduce the overhead of monitoring the object-oriented application.

Example 5

In this example, the key nodes are selected as follows. In Step A, a node with a maximum in-degree in the digraph is selected as a reference node. In Step B, an adjacent node in the digraph is judged as having an invocation relationship with the reference node. If the adjacent node is a node invoking the reference node and does not invoke other nodes than the reference node, the adjacent node is cancelled from the digraph. If the adjacent node is a node invoked by the reference node and is not invoked by other nodes than the reference node, then the adjacent node is cancelled from the digraph. In Step C, Step B is repeated for each uncancelled adjacent node until all the nodes are traversed.

Figure 9:
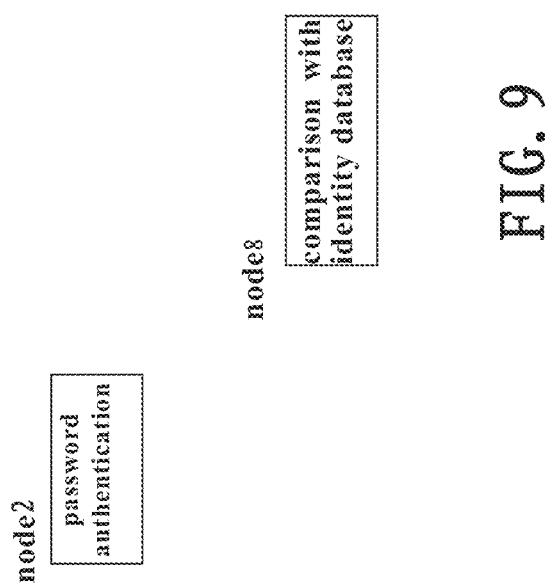
FIG. 9 shows key nodes finally left.

In this example, a node with a maximum in-degree is the node 8. Adjacent nodes which have invocation relationships with the node 8 are nodes 2, 4, 6, 7, 9, and only the node 2 invokes the node 11 in addition to the node 8. Thus, node 2 is reserved and the other adjacent nodes are cancelled. Adjacent nodes which have invocation relationships with the node 2 comprise nodes 10, 1 and 11. The three nodes cannot be reserved in the graph and thus are cancelled from the graph. As illustrated within FIG. 9, only the node 2 and the node 8 are selected as key nodes.

Figure 10:
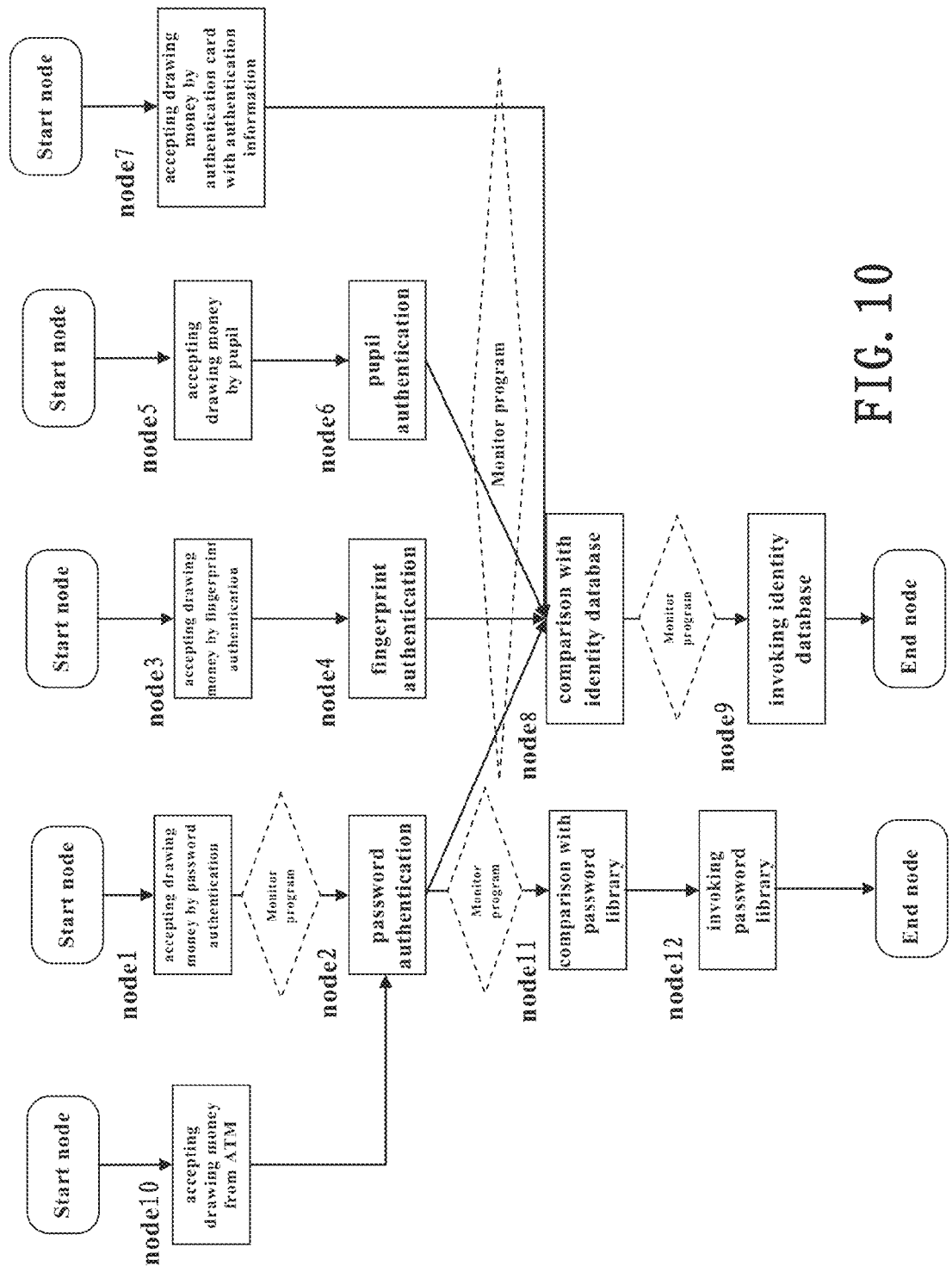
FIG. 10 is a transaction-representative-digraph instrumented with monitor programs.

Therefore, monitor programs are instrumented before and after the key nodes 2 and 8, as illustrated within FIG. 10. As already noted above, the monitor programs may be instrumented only before or after the key nodes 2 and 8. Since the above-described technique cancels nodes whose invocation relationships with other nodes are relatively simple, and reserves nodes whose invocation relationships with other nodes are relatively complex, only instrumenting monitor programs before and/or after the reserved nodes can greatly reduce the overhead of monitoring the object-oriented application.

Example 6

Figure 11:
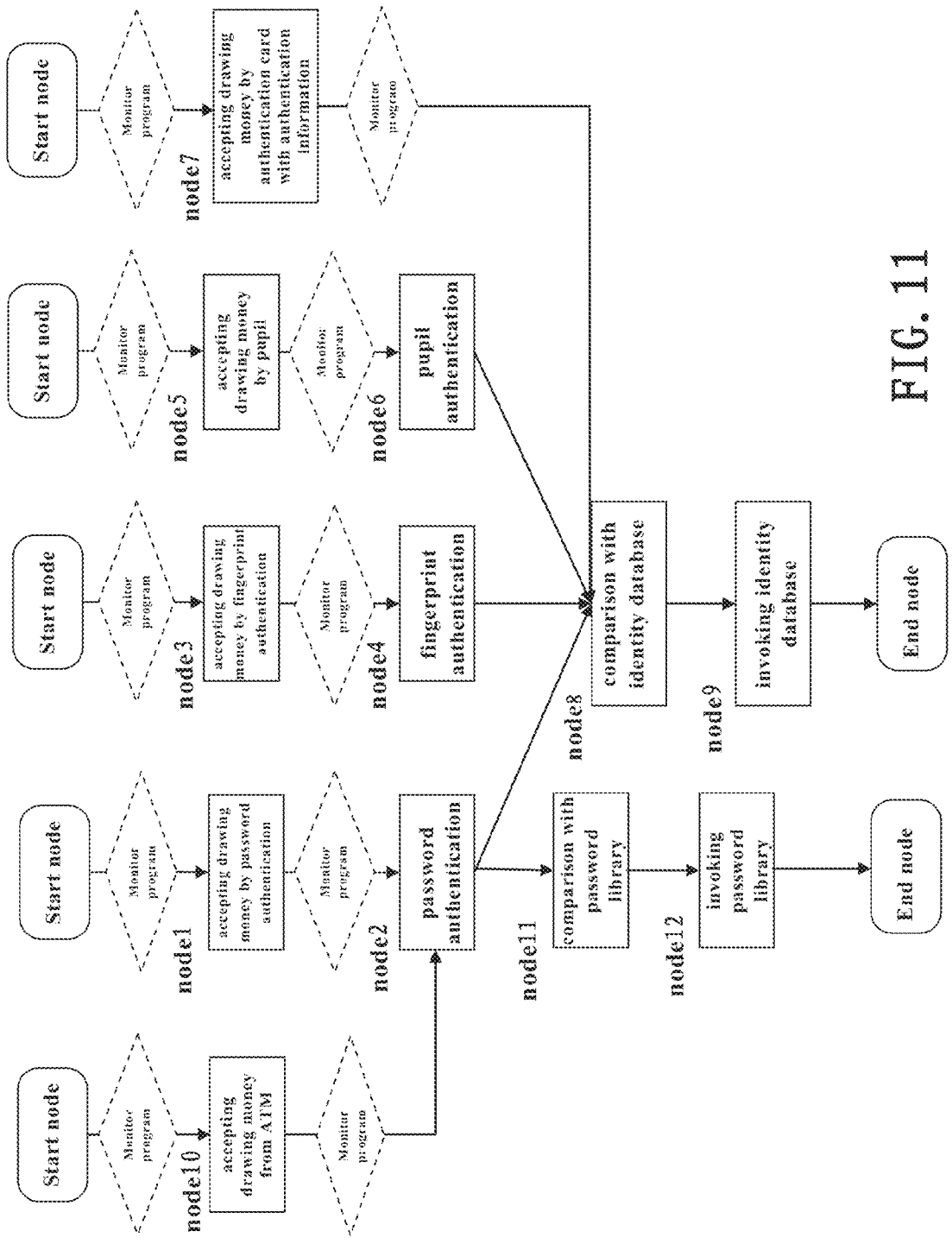
FIG. 11 is a transaction-representative-digraph instrumented with monitor programs.

In this example, all the top nodes in the figure are selected as key nodes. The top nodes in FIG. 4 are nodes 10, 1, 3, 5, 7, so monitor programs are instrumented before and after the nodes, as shown in FIG. 11. As already noted above, the monitor programs may be instrumented only before or after the selected nodes. In this manner, each class is guaranteed to be monitored while still reducing overhead.

Other Examples

There are other techniques of selecting key nodes and instrumenting monitor programs than the ones described in the first through sixth examples, and those skilled in the art, benefiting from the above-discussion, can develop other alternatives capable of selecting key nodes according to invocation relationships between the nodes of a plurality of replaceable classes in the graph and instrumenting monitor programs at the selected key nodes.

Figures 12A, 12B, 12C:
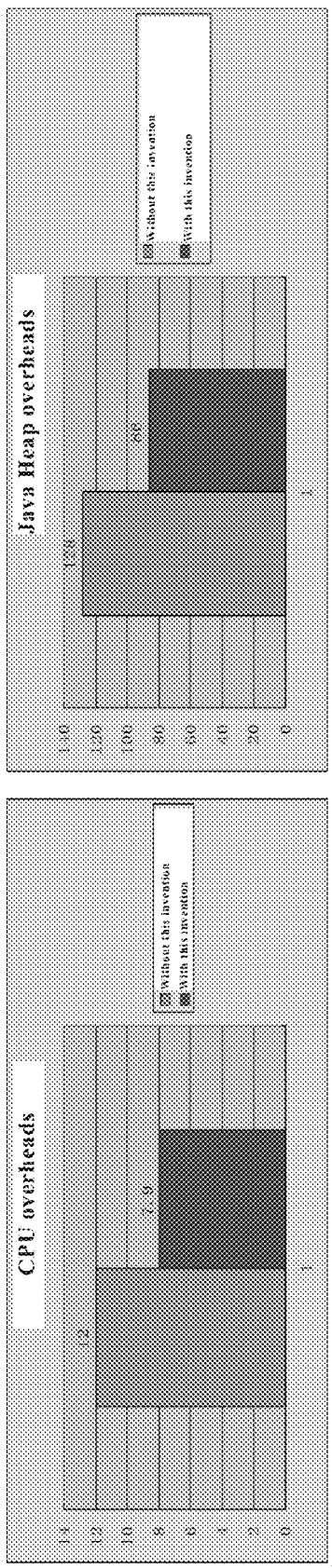
FIG. 12A respectively shows CPU overheads with and without the disclosed system.
FIG. 12B respectively shows Java Heap overheads with and without the disclosed system.
FIG. 12C respectively shows the number of instrument class and the number of instrument function of several transaction types with and without the disclosed system.

FIGS. 12A and 12B show, respectively, CPU overheads and Java Heap overheads while not using an implementation of the invention and while using an implementation of the invention. FIG. 12C shows the number of classes instrumented with monitor programs and the number of functions of the instrumented monitor programs for several transaction types while not using an implementation of the invention and while using an implementation of the invention. As illustrated therein, the number of classes instrumented with monitor programs and/or the number of functions of the instrumented monitor programs can be significantly reduced, and thus, the overhead of monitoring an object-oriented application can be reduced.

Figure 13:
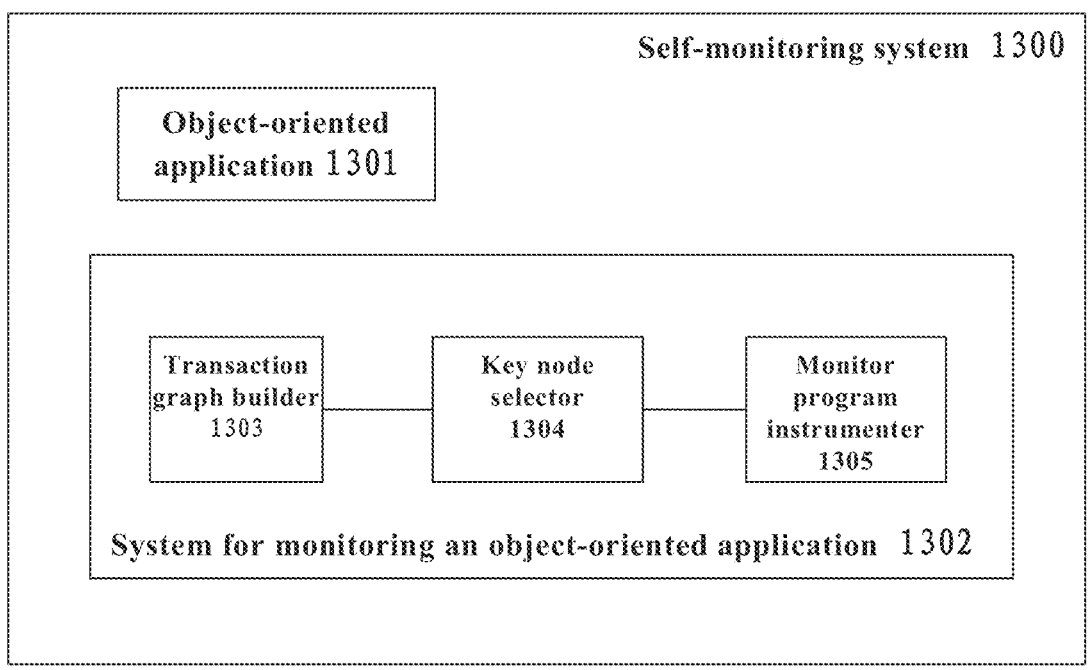
FIG. 13 shows a self-monitoring system.

FIG. 13 shows a self-monitoring system 1300 and comprises: an object-oriented application 1301 and a system 1302 for monitoring the object-oriented application. The system 1302 comprises a transaction graph builder 1303, a key node selector 104, and a monitory program instrumenter 1305. The transaction graph builder 1303 is configured to build a transaction-representative-digraph according to real-time running of the application, and the digraph contains nodes of a plurality of replaceable classes. The key node selector 1304 is configured to select key nodes according to invocation relationships between the nodes of the plurality of replaceable classes in the digraph. The monitor program instrumenter 1305 is configured to instrument monitor programs at the selected key nodes.

Figure 14:
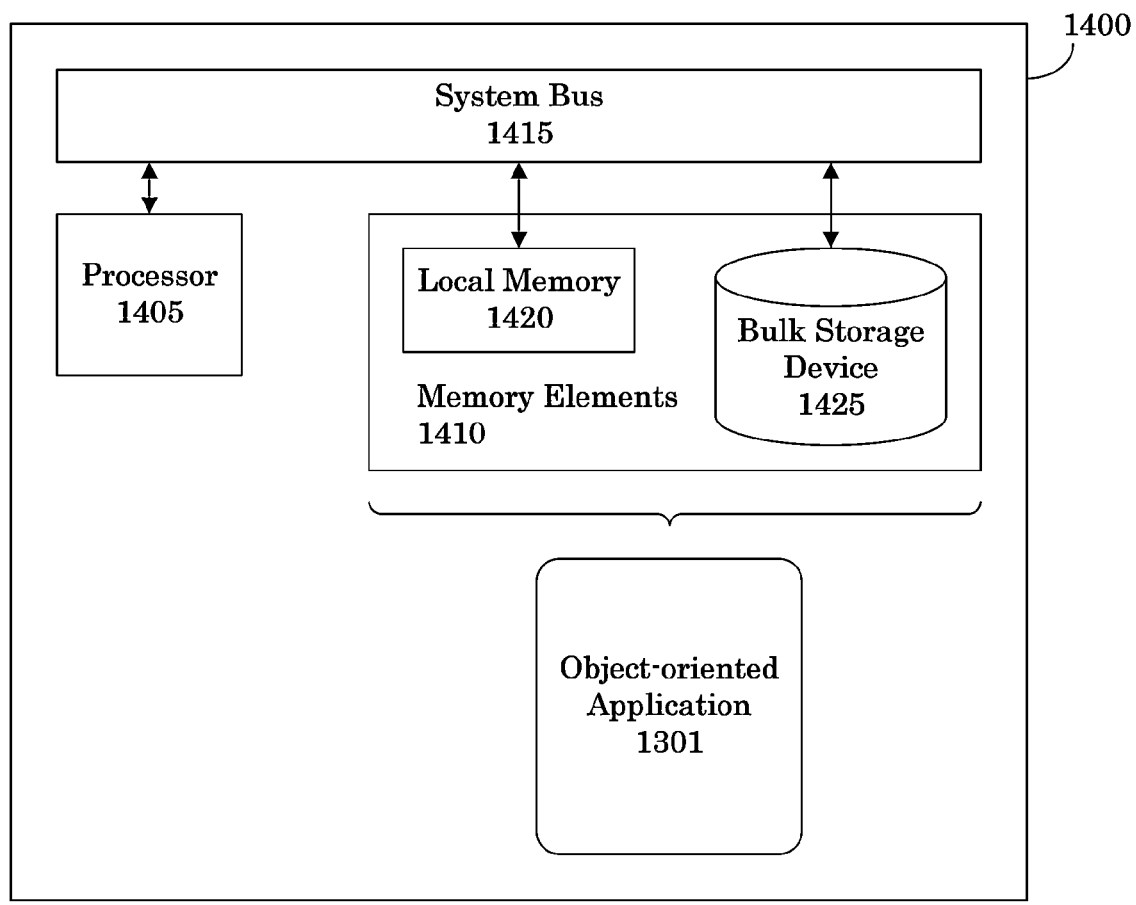
FIG. 14 is a block diagram illustrating a system in accordance with one embodiment of the present invention.

FIG. 14 is a block diagram illustrating a system 1400 for updating an application in accordance with one embodiment of the present invention. In one embodiment, the system 1400 can include at least one processor 1405 coupled to memory elements 1410 through a system bus 1415. As such, the system 1400 can store program code within the memory elements 1410. The processor 105 can execute the program code accessed from memory elements 1410 via the system bus 1415. In one aspect, for example, the system 1400 can be implemented as a computer that is suitable for storing and/or executing program code. It should be appreciated, however, that the system 1400 can be implemented in the form of any system comprising a processor and memory that is capable of performing the functions described within this specification.

The memory elements 1410 can include one or more physical memory devices such as, for example, local memory 1420 and one or more bulk storage devices 1425. Local memory 1420 refers to random access memory or other non-persistent memory device(s) generally used during actual execution of the program code. The bulk storage device(s) 1425 can be implemented as a HDD, SSD, or other persistent data storage device. The system 1400 also can include one or more cache memories (not shown) that provide temporary storage of at least some program code in order to reduce the number of times program code must be retrieved from bulk storage device 1425 during execution.

Input/output (I/O) devices (not shown) such as a keyboard, a display, and a pointing device optionally can be coupled to the system 1400. The I/O devices can be coupled to the system 1400 either directly or through intervening I/O controllers. Network adapters and/or communication ports also can be coupled to the system 1400 to enable the system 1400 to become coupled to other systems, computer systems, remote printers, and/or remote storage devices through intervening private or public networks. Modems, cable modems, and Ethernet cards are examples of different types of network adapters that can be used with the system 1400. Examples of suitable communication ports include, but are not limited to, parallel ports, serial ports, universal serial bus (USB) ports, IEEE 1394 ports, serial ATA (SATA) ports, and the like.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for monitoring an object-oriented application, comprising:
   building a transaction-representative-digraph of the application, the digraph including a plurality of nodes respectively corresponding to a plurality of replaceable classes;
   calculating an in degree for each of the plurality of nodes;
   calculating an out degree for each of the plurality of nodes;
   ranking each given node of the plurality of nodes, based upon a difference, for the given node, between the calculated in degree and the calculated out degree;
   selecting, based upon the ranking, at least one key node; and
   instrumenting a monitor program at the selected at least one key node, wherein
   the in-degree for a given node is a number of nodes, of the plurality of nodes, that invokes the given node, and
   the out degree for a given node is a number of nodes, of the plurality of nodes, that the given node invokes.

2. The method of claim 1, wherein
   the first n ranked node(s) are selected as the least one key node, and
   n is a natural number.

3. The method of claim 1, wherein
   each node(s) having a difference that reaches a threshold are selected as the least one key node.

4. The method of claim 1, wherein
   the monitor program is instrumented before and/or after the selected at least one key node without duplicating instrumentation before and/or after the selected at least one key node.

5. A computer hardware system configured to monitor an object-oriented application, comprising:
   at least one hardware processor, wherein the at least one hardware processor is configured to perform and/or generate instructions for:
      building a transaction-representative-digraph of the application, the digraph including a plurality of nodes respectively corresponding to a plurality of replaceable classes;
      calculating an in degree for each of the plurality of nodes;
      calculating an out degree for each of the plurality of nodes;
      ranking each given node of the plurality of nodes, based upon a difference, for the given node, between the calculated in degree and the calculated out degree;
      selecting, based upon the ranking, at least one key node; and
      instrumenting a monitor program at the selected at least one key node, wherein
   the in-degree for a given node is a number of nodes, of the plurality of nodes, that invokes the given node, and
   the out degree for a given node is a number of nodes, of the plurality of nodes, that the given node invokes.

6. The system of claim 5, wherein
   the first n ranked node(s) are selected as the least one key node, and
   n is a natural number.

7. The system of claim 5, wherein
   each node(s) having a difference that reaches a threshold are selected as the least one key node.

8. The system of claim 5, wherein
   the monitor program is instrumented before and/or after the selected at least one key node without duplicating instrumentation before and/or after the selected at least one key node.

9. A computer program product, comprising
   a computer readable storage medium having stored therein computer usable program code for monitoring an object-oriented application,
   the computer usable program code, which when executed by a computer hardware system, causes the computer hardware system to perform:
      building a transaction-representative-digraph of the application, the digraph including a plurality of nodes respectively corresponding to a plurality of replaceable classes;
      calculating an in degree for each of the plurality of nodes;
      calculating an out degree for each of the plurality of nodes;
      ranking each given node of the plurality of nodes, based upon a difference, for the given node, between the calculated in degree and the calculated out degree;
      selecting, based upon the ranking, at least one key node; and
      instrumenting a monitor program at the selected at least one key node, wherein
   the in-degree for a given node is a number of nodes, of the plurality of nodes, that invokes the given node, and
   the out degree for a given node is a number of nodes, of the plurality of nodes, that the given node invokes, and the computer readable storage medium is a storage apparatus.

10. The computer program product of claim 9, wherein the first n ranked node(s) are selected as the least one key node, and
n is a natural number.

11. The computer program product of claim 9, wherein each node(s) having a difference that reaches a threshold are selected as the least one key node.

12. The computer program product of claim 9, wherein the monitor program is instrumented before and/or after the selected at least one key node without duplicating instrumentation before and/or after the selected at least one key node.

* * * * *